Figure 1:
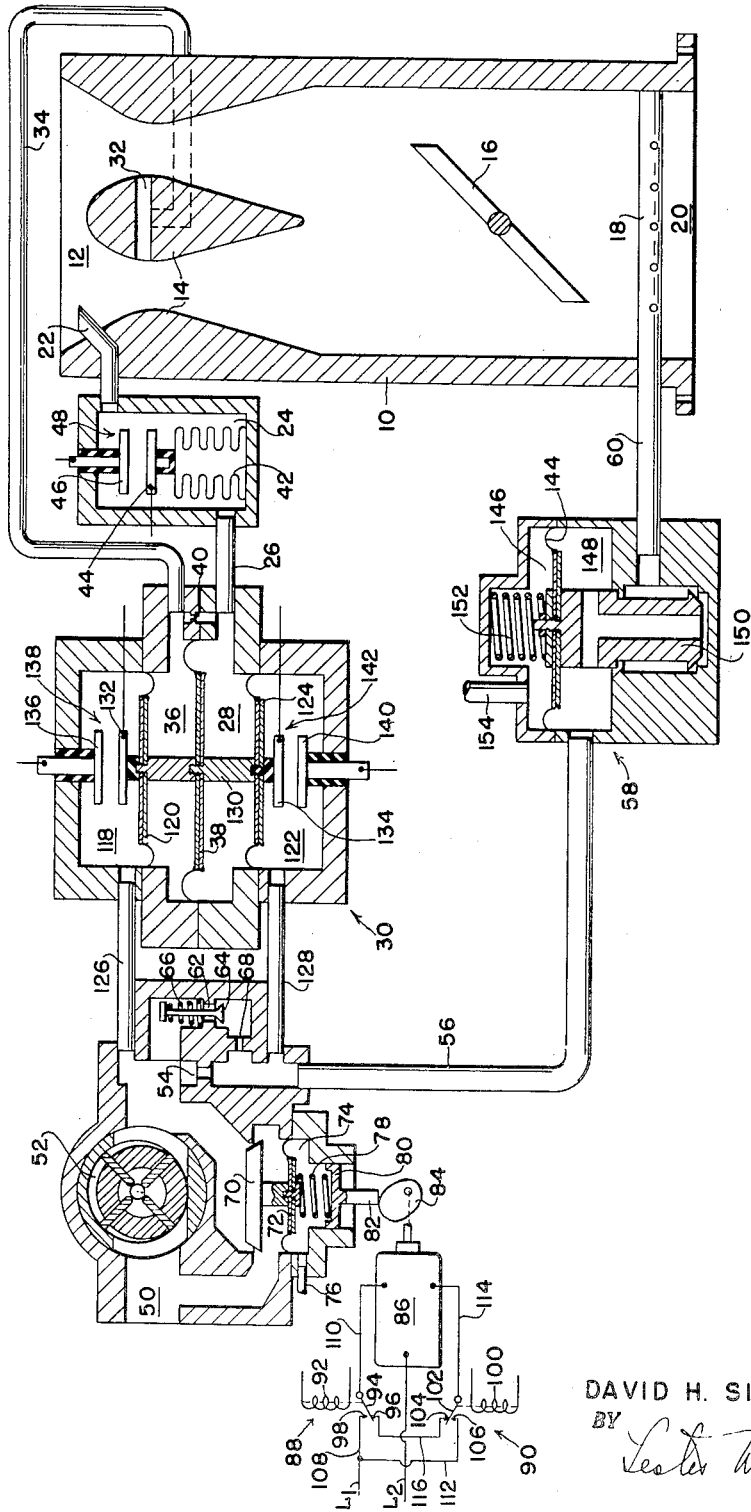

Dec. 4, 1951  D. H. SIEBENTHALER  2,577,435
CONTROL APPARATUS
Filed Sept. 5, 1946  2 SHEETS—SHEET 1

INVENTOR.
DAVID H. SIEBENTHALER
BY Lester W Clark
AGENT

Dec. 4, 1951     D. H. SIEBENTHALER     2,577,435

CONTROL APPARATUS

Filed Sept. 5, 1946     2 SHEETS—SHEET 2

*Fig. 3*

*Fig. 2*

INVENTOR.
DAVID H. SIEBENTHALER
BY *Lester W Clark*
AGENT

Patented Dec. 4, 1951

2,577,435

UNITED STATES PATENT OFFICE 2,577,435

CONTROL APPARATUS

David H. Siebenthaler, Meriden, Conn., assignor, by mesne assignments, to Niles-Bement-Pond Company, West Hartford, Conn., a corporation of New Jersey Application September 5, 1946, Serial No. 695,009

12 Claims. (Cl. 261—39)

This invention relates to control apparatus for regulating a variable condition in response to changes in a controlling condition, which may be the same as the regulated condition or otherwise. In particular, the invention relates to carubretors for internal combustion engines.

The carburetor disclosed is intended for use on aircraft, althought it may be used on other types of engines. Also, the condition control system disclosed herein may be used to control other variable conditions.

Carburetors for internal combustion engines, particularly those used on aircraft, commonly include some means for measuring the rate of air flow to the engine, means for measuring the rate of fuel flow to the engine, means for balancing these two measurements against each other, and means responsive to the balance or unbalance of the two measurements for controlling one or the other of the two flows to maintain a constant fuel-air ratio. Since the density of the air varies, it is common to provide some means for correcting the air flow measuring means or the measurement balancing means for variation in air density.

The present invention includes electrical means for measuring the balance between the fuel and the air flows, and electrical means for compensating the action of the balance measuring means in response to variations in air density. The present invention further contemplates the use of an electrical signal produced by these electrical means to control suitable motor means which regulate the fuel flow. It is proposed to use gas-filled electric discharge tubes of the well-known "Thyratron" type to respond to the electrical signal and to control the motor. Such tubes are very sensitive to applied signals. For that reason, they are very desirable in control systems where a quick response to a small variation in a variable condition is needed. However, these tubes are so sensitive that they are apt to respond to stray electric fields in their vicinity, which fields are not related to the controlled or the controlling conditions. This invention includes a new motor control circuit using "Thyratron," wherein the sensitivity characteristics of the tubes are retained, without subjecting the system to undesired control impulses caused by stray electrical fields and other outside influences.

It is therefore an object of the present invention to provide an improved carburetor for an internal combustion engine.

Another object of the present invention is to provide an improved control system for regulating a variable condition in response to a controlling condition.

A further object of the invention is to provide an improved electrical motor control system employing sensitive electrical gas-filled discharge tubes.

Other objects and advantages of the present invention will become apparent from a consideration of the appended specification, claims and drawings, in which Figure 1 represents, somewhat diagrammatically, a carburetor for an internal combustion engine embodying the principles of my invention, with the electrical circuits thereof omitted, Figure 2 illustrates a modified form of motor control apparatus, which may be used in place of that shown in Figure 1, and Figure 3 illustrates an electrical wiring diagram which may be used in the carburetor of Figure 1.

Referring to Figure 1, there is shown a portion of a body 10 of a carburetor, through which air flows from an entrance 12, past a Venturi structure 14, a throttle 16 and a fuel discharge nozzle 18 to an outlet 20.

An impact tube 22 conveys air at the impact pressure existing in the entrance 12 to a chamber 24. The chamber 24 is connected by a conduit 26 to a chamber 28 in a control device generally indicated at 30. The throat of venturi 14 is connected through conduits 32 and 34 to a chamber 36 in the control device 30. The chambers 28 and 36 are separated by a flexible diaphragm 38, and are connected by a fixed restriction 40.

A bellows 42 is mounted in the chamber 24 and carries at its free end a condenser plate 44. A stationary condenser plate 46 is mounted at the opposite end of chamber 24. The condenser plates 44 and 46 together form a variable condenser generally indicated at 48.

Fuel flows through the carburetor of Figure 1 from an inlet 50 through a rotary sliding vane pump 52 and a fixed restriction 54, a conduit 56, a pressure regulator 58 and a conduit 60 to the fuel discharge nozzle 18. By-passing the restriction 54 is a passage including a variable restriction 62 controlled by a valve 64 biased to closed position by a spring 66, and a restriction 68 in series with the restriction 62.

The pressure regulator 58 maintains a constant pressure on the downstream side of restriction 54. The fuel flow is regulated by means of a pressure relief valve 70, which controls a conduit leading from the pump outlet to the pump inlet, and thereby regulates the pressure on the upstream side of restriction 54. Valve 70 is attached to a balancing diaphragm 72. A chamber 74 under diaphragm 72 is provided with a vent connection 76. If the engine is supercharged, this connection should lead to the impact tube 22. Otherwise, the vent connection may lead to the atmosphere or to any other suitable source of substantially constant pressure. The valve 70 is biased toward closed position by a spring 78 retained between the diaphragm 72 and a retainer 80 having a projection 82 which engages and serves as a follower for a cam 84.

The pump inlet pressure acts upwardly on valve 70 and downwardly on the equivalent area of diaphragm 72. The valve is therefore balanced against pump inlet pressure. The pump discharge pressure acts downwardly on valve 70 and is opposed by spring 78 and the pressure in chamber 74. The pump discharge pressure moves the valve 70 downwardly, thereby opening it and reducing the pump discharge pressure until that pressure balances the force of spring 78. Hence the cam 84, thru its control of the force of spring 78, controls the pump discharge pressure.

The cam 84 is driven by a reversible motor 86. Motor 86 is controlled by a pair of relays 88 and 90. Relay 88 includes a winding 92 which controls the movements of a switch arm 94 between a back contact 96 and a front contact 98. Relay 90 includes a winding 100 which controls the movements of a switch arm 102 between a back contact 104 and a front contact 106.

When winding 92 of relay 88 is energized, switch arm 94 engages contact 98 whereupon an energizing circuit for motor 86 is completed from a supply line L₁ through a conductor 108, contact 98, switch arm 94, conductor 110, and motor 86 to supply line L₂.

When winding 100 of relay 90 is energized, switch arm 102 engages contact 106, thereby completing and energizing circuit for motor 86 from supply line L₁, through a conductor 112, contact 106, switch arm 102, conductor 114, and motor 86 to supply line L₂. The two circuits just traced include separate windings of motor 86, which, when energized, cause operation of the motor 86 in opposite directions.

When both winding 92 of relay 88 and winding 100 of relay 90 are de-energized, both windings of motor 86 are connected in series in a circuit which may be traced from motor 86 through conductor 110, switch arm 94, contact 96, conductor 116, contact 104, switch arm 102 and conductor 114 back to motor 86. This provides a dynamic braking circuit for the motor, so that the motor quickly comes to a stop whenever both relay windings are de-energized.

The control device 30 includes a chamber 118 separated from chamber 36 by a flexible diaphragm 120. It also includes a chamber 122 separated from chamber 28 by flexible diaphragm 124. Chamber 118 is connected through a conduit 126 to the fuel supply line at the upstream side of the restriction 54. Chamber 122 is connected through a conduit 128 to the fuel supply line at the downstream side of the restriction 54. The central portions of the diaphragms 120, 38 and 124 are connected by a stem structure 130, so that all the diaphragms move in unison. Inside the chamber 118, the stem structure 130 carries a movable condenser plate 132. Another movable condenser plate 134 is carried by the stem structure 130 inside the chamber 122.

The condenser plate 132 co-operates with a stationary condenser plate 136, and with it forms a variable condenser generally indicated at 138. The movable condenser plate 134 co-operates with a stationary condenser plate 140, and with it forms a variable condenser generally indicated at 142.

The pressure regulator 58 includes a diaphragm 144 separating a pair of expansible chambers 146 and 148. A valve 150 is carried at the center of diaphragm 144. A spring 152 biases valve 150 toward closed position. The chamber 146 is vented at 154. The vent 154 should lead to the same place as the vent connection 76 on the pump 52. Chamber 148 is connected to conduit 56. The valve 150 is positioned in accordance with the balance between the pressure in chamber 148 and the spring 152. The pressure in chamber 146 is so much lower than the pressure in chamber 148 and the strength of spring 152 that it may be neglected. The valve 150 maintains a substantially constant pressure in chamber 148, depending upon the strength of spring 152. In this way, variations in pressure at the discharge nozzle 18 are prevented from affecting the pressure on the downstream side of metering restriction 54, and thereby disturbing the metering characteristics of that restriction.

*Figure 2*

There is illustrated in Figure 2 a modified form of motor control system which may be used in place of the motor 86 and the relays 88 and 90 of Figure 1. In Figure 2 there is shown a continuously running motor 200 which drives a gear 202. Gear 202 engages a gear 204 and an idler gear 206, through which it drives a gear 208. A pair of electromagnets 210 and 212 are provided to operate a pair of clutches 214 and 216. When electromagnet 210 is energized, it operates clutch 214 to connect gear 204 with a gear 218. When electromagnet 212 is energized, it operates clutch 216 to connect gear 208 with a gear 220. The gears 218 and 220 both engage a gear 222 on the shaft 85 of cam 84. It may therefore be seen that when electromagnet 210 is energized, the cam 84 is driven in one direction and when electromagnet 212 is energized, the cam 84 is driven in the opposite direction. The windings of electromagnets 210 and 212 may be energized in the same manner as the windings of relays 88 and 90 of Figure 1.

*Figure 3*

The wiring diagram of Figure 3 shows a bridge circuit 300 having a pair of input terminals 302 and 304 and a pair of output terminals 306 and 308. The input terminals 302 and 304 are connected by conductors 310 and 312, respectively, to taps 314 and 316 on the secondary winding 318 of a power input transformer 320. The transformer 320 has a primary winding 322 connected to the power supply lines L₁ and L₂. The output terminals 306 and 308 of the bridge circuit are connected to the terminals of the primary winding 324 of an output transformer 326 by means of conductors 327 and 329, respectively. Transformer 326 has a secondary winding 328.

A full-wave rectifier circuit is connected between the conductors 310 and 312 and a center tap 330 on the transformer winding 318 to provide a unidirectional biasing potential across a resistance 332. One half of the rectifier circuit may be traced from tap 314 through conductor 310, a conductor 334, the anode 336 of a double diode indicated generally at 338, cathode 340, a conductor 342, resistance 332 and a conductor 344 to tap 330. The other half of the rectifier circuit may be traced from tap 316 through conductor 312, a conductor 346, anode 348, cathode 350, conductor 342, resistance 332 and conductor 344 to tap 330. A filter condenser 352 is provided in parallel with resistance 332 and another filter condenser 354 is connected between one end of resistance 352 and a movable tap 356.

It will be readily understood that the two halves of the rectifier circuit described above rectify opposite half cycles of the applied potential, and a substantially unidirectional potential is thereby secured across resistance 332. By moving the tap 356 along the resistance 332, a varying amount of this unidirectional potential may be secured between the tap 356 and the right-hand terminal of resistance 332.

The secondary winding 328 of transformer 326 and the portion of resistance 332 between the tap 356 and its right-hand terminal are connected in series in a common branch of the input circuits of a pair of gas-filled electrical discharge devices 358 and 360. These devices may be of the well-known "Thyratron" type. The device 358 includes an anode 362, a pair of control electrodes 364 and 366, and a cathode 368. The device 360 includes an anode 370, a pair of control electrodes 372 and 374, and a cathode 376.

The input circuit of the discharge device 358 may be traced from control electrode 366 through conductors 378 and 380, secondary winding 328, a conductor 382, tap 356 and the right-hand portion of resistance 332, conductors 384 and 386, condenser 388 and resistance 390 to cathode 368. The output circuit of the discharge device 358 may be traced from anode 362 through a conductor 392, the upper half of secondary winding 318, tap 330, conductors 344, 384 and 386, condenser 388 and resistance 390 to cathode 368.

The input circuit of discharge device 360 may be traced from control electrode 374 through conductors 394 and 380, secondary winding 328, conductor 382, tap 356, the right-hand portion of resistance 332, conductors 384 and 396, a condenser 398, and a resistance 400 to cathode 376. The output circuit of the discharge device 360 may be traced from anode 370 through a conductor 402, the lower half of secondary winding 318, conductors 344 and 384, conductor 396, condenser 398, and resistance 400 to cathode 376.

Connected in series across the terminals of condenser 388 are a gas-filled diode 402 and the relay winding 92 of Figure 1. Similarly connected in series across the terminals of condenser 398 are a gas-filled diode 404 and the winding 100 of relay 90 of Figure 1. These diodes have a characteristic, well known in the art, that a higher potential is required to initiate a discharge thru them than is required to maintain the discharge after its initiation.

*Operation*

The variable condensers 138 and 142 are connected in adjacent arms of the bridge circuit 300. The variable condenser 48 is connected in a third arm, and a manually variable condenser 309 is connected in the fourth arm of the bridge circuit 300. The condenser 309 is adjusted so that when the air and fuel flows balance each other, the bridge circuit is balanced and therefore the electrical potential appearing between its output terminals is zero. There is therefore no potential induced in secondary winding 328.

If it is assumed that there is initially no charge of the condensers 388 and 398, then the only potential impressed on the input circuit of the discharge devices 358 and 360 is the positive biasing potential between the tap 356 in the right end of resistance 332. This renders the discharge devices 358 and 360 conductive during the respective half cycles during which they may be conductive due to their opposite connection to the transformer winding. As the discharge devices conduct, they build charges on the condensers 388 and 398. If the charge of condenser 388, for example, exceeds a predetermined amount determined by the characteristics of relay winding 92 and the diode 402, then the condenser 388 discharges to diode 402 and winding 92, thereby momentarily energizing winding 92 and operating the relay 88 to energize motor 86 for operation in one direction. Winding 92 is energized for a period long enough to reduce the terminal voltage of condenser 388 below the value required to maintain diode 402 conductive. However, as the charge builds up on condenser 388, it supplies an additional negative potential to the control electrode 366, because the left terminal of condenser 388 is negative, since current flows through the discharge device 358 only in the direction from the anode to the cathode. If the only potentials appearing in the input circuit of the discharge device 358 are the potential across the condenser 388 and the biasing potential of resistance 332, then the potential across condenser 388 will build up either until it discharges through diode 402 or until it becomes sufficiently great to bias the discharge device 358 to cut-off. The tap 356 of resistance 332 is preferably so adjusted that the potential of condenser 388 completely opposes it and biases the discharge device 358 to cut-off just before the potential of condenser 388 becomes large enough to cause a discharge through diode 402. A similar situation exists with respect to condenser 398 and discharge device 360.

The normal state of affairs when the bridge circuit is balanced is then to have condensers 388 and 398 charged almost but not quite enough to discharge across the diodes 402 and 404, respectively. Under such conditions, if the bridge circuit becomes unbalanced, which may be due to either the air or fuel flow becoming too large with respect to the other flow or to a variation in the density of the air, then an output potential appears between output terminals 306 and 308 of the bridge circuit. This output potential is amplified by transformer 326 and the amplified potential appears in secondary winding 328. If the bridge circuit is unbalanced in one direction, this potential will have a certain phase, and if the bridge circuit is unbalanced in the opposite direction, this potential will have the opposite phase, in accordance with the well-known characteristics of alternating current bridge circuits. Whichever phase it has, it will be the same as the phase of the power voltage applied between anode and cathode of one or the other of the two discharge devices 358 and 360. If it appears to be out of phase with both of these voltages, then suitable phase shifting or networks may be introduced to correct the situation.

In any event, the potential induced in secondary winding 328 adds a positive potential to the control electrodes 366 and 374 during the half cycle when one or the other of the two discharge devices 358 and 360 may become conductive. Therefore, one of the two discharge devices will conduct, thereby increasing the charge on its associated condenser 388 or 398, and building up that charge to a point where the condenser discharges through the diode and the associated relay windings to cause operation of the motor. The relay windings and the motor windings are so connected that the motor is thereby driven in a direction to vary the fuel flow so as to correct the balance between the air and fuel flows and restore the balance of the bridge circuit.

It may be seen that after one discharge of the condenser 388, the motor cannot receive another energizing impulse until the condenser 388 has had time to recharge. Therefore, the motor is energized in intermittent pulses. The time between these pulses depends upon the electrical characteristics of the condenser 388 and the resistance 390, and the circuit in which they are connected. It should further be noted that if the bridge circuit remains unbalanced, that is, if the first pulse is not sufficient to correct it, then the unbalance of the bridge circuit increases the conductivity of the affected discharge device, and thereby increases the charging rate of the condenser associated with it. The greater the unbalance of the bridge circuit, the greater the increase in the charging rate of the condensers, and the faster the pulses come one after the other. The circuit may be arranged so that upon extreme unbalance of the bridge, the charging rate is sufficient to maintain a continuous flow thru the diodes and relays, and hence to maintain the motor continuously energized. Therefore, it may be seen that the motor 36 is driven in a direction depending upon the direction of unbalance of the bridge circuit and at an average rate which depends upon the magnitude of unbalance of the bridge circuit. The unbalance of the bridge circuit is in turn an indication of the unbalance between the fuel flow and air flow in the carburetor.

If one of the discharge devices 358 or 360 is tripped due to a stray electrical impulse entering the system, then the erroneous tripping of the discharge device cannot be repeated until a sufficient time has passed for the charge on the condenser to build up again. This time element also gives the system time to react to the tripping of the relay so as to unbalance the bridge circuit slightly and cause a tripping of the opposite relay to restore the balance condition. It may therefore be seen that the control circuit shown is very stable and that it is not subject to severe disturbance by undesired outside influences.

It should also be noted that after an unbalance of the bridge circuit, the motor is slowed down as the bridge circuit approaches its balanced condition, thereby preventing the system from overshooting, which is a common fault of electrical motor control systems.

Movement of the tap 356 along resistance 332 varies the positive biasing potential applied to the control electrodes 366 and 374. This varies the sensitivity of the system in that it determines the minimum unbalance of the bridge circuit which will cause an operation of the motor.

Movement of tap 356 also regulates the sensitivity of the system to stray impulses. The position of tap 356 determines the potential across the condensers 388 and 398 under normal balanced conditions. It therefore determines the difference between that normal potential and the potential on those condensers which will trip their associated thyratrons. A stray impulse can only cause operation of the motor if its duration is sufficient to charge the condensers to the tripping potential. In this way, the stability of the system in the presence of stray impulses is greatly increased.

The terms and expressions which I have employed are for use as terms of description and not of limitation, and I have no intention in the use of such terms and expressions, of excluding any equivalent of the features shown and described or portions thereof, but recognize that various modifications are possible within the scope of the invented claims.

I claim as my invention:

1. Control apparatus including reversible motor means having a pair of windings to be selectively energized in accordance with the direction of departure of a variable condition from a predetermined value, an energizing circuit for each of said windings including a first gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge thru said device and said winding, thereby energizing said winding, means for charging said condenser including a second gas-filled electric discharge device having an anode, a cathode and a control electrode, means connecting one terminal of said condenser to said cathode, means connecting the other terminal of said condenser to said anode, means connecting said other terminal to said control electrode so that the potential across said condenser biases said control electrode negatively with respect to said cathode, means in said last-named connecting means for introducing therein a positive biasing potenial opposed to said condenser potential, means in said last-named connecting means for introducing therein a signal potential varying in polarity in accordance with the direction of departure of said condition from said value, a source of alternating electrical energy, means connecting the anodes and cathodes of said second discharge devices to said source in phase opposition, and means for varying said positive biasing potential with respect to said predetermined value of condenser potential to control the sensitivity of response of said control apparatus to said signal potential.

2. Control apparatus including reversible motor means having a pair of windings to be selectively energized in accordance with the direction of departure of a variable condition from a predetermined value, an energizing circuit for each of said windings including a gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge thru said device and said winding, thereby energizing said winding, and means for selectively charging the condensers in said circuits in accordance with the direction of departure of said condition from said value.

3. Control apparatus including reversible motor means having a pair of windings to be selectively energized in accordance with the direction and magnitude of departure of a variable condition from a predetermined value, an energizing circuit for each of said windings including a gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge thru said device and said winding, thereby energizing said winding, and means for selectively charging the condensers in said circuits in accordance with the direction of departure of said condition from said value, and for varying the rate of charge of said condensers in accordance with the magnitude of departure of said condition from said value.

4. Control apparatus including an electrical winding to be intermittently energized in accordance with the magnitude of departure of a variable condition from a predetermined value, an energizing circuit for said winding including a gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge thru said device and said winding, thereby energizing said winding, means for charging said condenser, means for varying the rate of charge in accordance with the magnitude of departure of said condition from said value.

5. Control apparatus including reversible motor means having a pair of windings to be selectively energized in accordance with the direction of departure of a variable condition from a predetermined value, an energizing circuit for each of said windings including a first gas-filled electric discharge device having a pair of electrodes connected in series with said winding, a condenser connected in parallel with said winding and said electrodes in series, said condenser being effective when the potential across it exceeds a value predetermined by the chaarcteristics of said device and said winding to discharge thru said device and said winding, thereby energizing said winding, means for charging said condenser including a second gas-filled electric discharge device having an anode, a cathode and a control electrode, means connecting one terminal of said condenser to said cathode, means connecting the other terminal of said condenser to said anode, means connecting said other terminal to said control electrode so that the potential across said condenser biases said control electrode negatively with respect to said cathode, means in said last-named connecting means for introducing therein a positive biasing potential opposed to said condenser potential and having a value sufficiently smaller than said predetermined value of condenser potential so that said condenser potential biases said discharge device to cut off before said condenser is charged to said predetermined value when said condenser potential and said biasing potential are the only potentials in said last-named connecting means, means in said last-named connecting means for introducing therein a signal potential varying in polarity in accordance with the direction of departure of said condition from said value, and means for varying said positive biasing potential with respect to said predetermined value of condenser potential to control the sensitivity of response of said control apparatus to said signal potential.

6. A fuel supply system for an internal combustion engine, comprising means for measuring the rate of flow of combustion air to said engine, means for measuring the rate of flow of fuel to said engine, first and second variable condensers, means including both said measuring means for simultaneously and oppositely varying the capacitance of said condensers in accordance with the balance between said air and fuel flows, a third variable condenser, means responsive to the density of said combustion air for varying said third condenser, a bridge circuit, means connecting said first and second condensers in adjacent arms of said bridge circuit, means connecting said third condenser in another arm of said bridge circuit, and means responsive to the unbalance potential of said bridge circuit for controlling the flow of fuel to said engine.

7. A fuel supply system for an internal combustion engine, comprising means for measuring the rate of flow of combustion air to said engine, means for measuring the rate of flow of fuel to said engine, first and second variable condensers, means including both said measuring means for simultaneously and oppositely varying the capacitance of said condensers in accordance with the balance between said air and fuel flows, a third variable condenser, means responsive to the density of said combustion air for varying said third condenser, a bridge circuit, means connecting said first and second condensers in adjacent arms of said bridge circuit, means connecting said third condenser in another arm of said bridge circuit, means for controlling the flow of fuel to said engine including reversible motor means having a pair of windings to be selectively energized to cause operation of said fuel flow control means in opposite directions, an energizing circuit for each of said windings including a first gas-filled electric discharge device having a pair of electrodes connected in series with said winding, a fixed condenser connected in parallel with said winding and said electrodes in series, said fixed condenser being effective when the potential across it exceeds a value predetermined by the characteristics of said device and said winding to discharge thru said device and said winding, thereby energizing said winding, means for charging said fixed condenser including a second gas-filled electric discharge device having an anode, a cathode and a control electrode, means connecting one terminal of said fixed condenser to said cathode, means connecting the other terminal of said fixed condenser to said anode, means connecting said other terminal to said control electrode so that the potential across said fixed condenser biases said control electrode negatively with respect to said cathode, means in said last-named connecting means for introducing therein a positive biasing potential opposed to said fixed condenser potential, and means in said last-named connecting means for introducing therein a signal potential varying in polarity and magnitude in accordance with the unbalance potential of said bridge circuit, and means for varying said positive biasing potential with respect to said predetermined value of condenser potential to control the sensitivity of response of said fuel flow control means to said signal potential.

8. A carburetor for internal combustion engines comprising an air supply and a fuel supply, means for measuring the rates of flow of said air and fuel supplies, means for balancing said measurements against each other, and electronic means, responsive to the balance or unbalance of said measurements, for controlling the rate of fuel flow; said control means including reversible motor means having a pair of windings to be selectively energized in acordance with the direction of departure of said measurements from a predetermined balance, an energizing circuit for each of said windings including a gas-filled eletcric discharge device having a pair of electrodes connected in series with said winding, a condenser connected in parallel with said winding and said electrodes in series, said condenser being effective when the potential across it exceeds a value predetermined by the characteristics of said device and said winding to discharge through said device and said winding, thereby energizing said winding, and means for selectively charging the condensers in said circuits in acordance with the direction of departure of said measurements from said balance.

9. A carburetor for internal combustion engines comprising an air supply and a fuel supply, means for measuring the rates of flow of said air and fuel supplies, means for balancing said measurements against each other, and electronic means, responsive to the balance or unbalance of said measurements, for controlling the rate of fuel flow; said control means including reversible motor means having a pair of windings to be selectively energized in accordance with the direction of departure of said measurements from a predetermined balance, an energizing circuit for each of said windings including a first gas-filled electric discharge device having a pair of electrodes connected in series with said winding, a condenser connected in parallel with said winding and said eletcrodes in series, said condenser being effective when the potential across it exceeds a value predetermined by the characteristics of said device and said winding to discharge through said device and said winding, thereby energizing said winding, means for charging said condenser including a second gas-filled electric discharge device having an anode, a cathode and a control electrode, means connecting one terminal of said condenser to said cathode, means connecting the other terminal of said condenser to said anode, means connecting said other terminal to said control electrode so that the potential across said condenser biases said control electrode negatively with respect to said cathode, means in said last-named connecting means for introducing therein a positive biasing potential opposed to said condenser potential, means in said last-named connected means for introducing therein a signal potential varying in polarity in accordance with the direction of departure of said measurements from said balance, a source of alternating electrical energy, means connecting the anodes and cathodes of said second discharge devices to said source in phase opposition, and means for varying said positive biasing potential with respect to said predetermined value of condenser potential to control the sensitivity of response of said control apparatus to said signal potential.

10. A carburetor for internal combusion engines comprising an air supply and a fuel supply, means for measuring the rates of flow of said air and fuel supplies, means for balancing said measurements against each other, and electronic means, responsive to the balance or unbalance of said measurements, for controlling the rate of fuel flow; said control means including reversible motor means having a pair of windings to be selectively energized in accordance with the direction and magnitude of departure of said measurements from a predetermined balance, an energizing circuit for each of said windings including a gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge through said device and said winding, thereby energizing said winding, and means for selectively charging the condensers in said circuits in accordance with the direction of departure of said measurements from said balance, and for varying the rate of charge of said condensers in accordance with the magnitude of departure of said measurements from said balance.

11. A carburetor for internal combustion engines comprising an air supply and a fuel supply, means for measuring the rates of flow of said air and fuel supplies, means for balancing said measurements against each other, and electronic means, responsive to the balance or unbalance of said measurements, for controlling the rate of fuel flow; said control means including an electrical winding adapted to be intermittently energized in accordance with the magnitude of departure of said measurements from a predetermined balance, an energizing circuit for said winding including a gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge through said device and said winding, thereby energizing said winding, means for charging said condenser, means for varying the rate of charge in accordance with the magnitude of departure of said measurements from said balance.

12. A carburetor for internal combustion engines comprising an air supply and a fuel supply, means for measuring the rates of flow of said air and fuel supplies, means for balancing said measurements against each other, and electronic means, responsive to the balance or unbalance of said measurements, for controlling the rate of fuel flow; said control means including reversible motor means having a pair of windings to be selectively energized in accordance with the direction of departure of said measurements from a predetermined balance, an energizing circuit for each of said windings including a first gas-filled electric discharge device having a pair of electrodes connected in series with said winding, a condenser connected in parallel with said winding and said electrodes in series, said condenser being effective when the potential across it exceeds a value predetermined by the characteristics of said device and said winding to discharge through said device and said winding, thereby energizing said winding, means for charging said condenser including a second gas-filled electric discharge device having an anode, a cathode and a control electrode, means connecting one terminal of said condenser to said cathode, means connecting the other terminal of said condenser to said anode, means connecting said other terminal to said control electrode so that the potential across said condenser biases said control electrode negatively with respect to said cathode, means in said last-named connecting means for introducing therein a positive biasing potential opposed to said condenser potential and having a value sufficiently smaller than said predetermined value of condenser potential so that said condenser potential biases said discharge device to cut off before said condenser is charged to said predetermined value when said condenser potential and said biasing potential are the only potentials in said last-named connecting means, means in said last-named connecting means for introducing therein a signal potential varying in polarity in accordance with the direction of departure of said measurements from said balance, and means for varying said positive biasing potential with respect to said predetermined value of condenser potential to control the sensitivity of response of said control apparatus to said signal potential.

DAVID H. SIEBENTHALER.

REFERENCES CITED

The following references are of record in the file of this patent:

UNITED STATES PATENTS

| Number | Name | Date |
|---|---|---|
| 1,911,656 | Van Benschoten | May 30, 1933 |
| 1,960,350 | Shackleton et al. | May 29, 1934 |
| 2,154,375 | Chambers | Apr. 11, 1939 |
| 2,372,766 | Colvin et al. | Apr. 3, 1945 |
| 2,395,648 | Teichert | Feb. 26, 1946 |
| 2,482,254 | Fairchild | Sept. 20, 1949 |
| 2,488,221 | Moore | Nov. 15, 1949 |